Patented July 7, 1925.

1,545,419

UNITED STATES PATENT OFFICE.

ANTONIUS FOSS, BIRGER FJELD HALVORSEN, AND NICOLAI STEPHANSEN, OF CHRISTIANIA, NORWAY, ASSIGNORS TO NORSK HYDRO-ELEKTRISK KVAELSTOFAKTIESELSKAB, OF CHRISTIANIA, NORWAY.

PROCESS FOR THE MANUFACTURE OF HYDROGEN, CARBON MONOXIDE, OR MIXTURES OF THESE GASES.

No Drawing. Application filed March 9, 1922. Serial No. 542,460.

*To all whom it may concern:*

Be it known that we, ANTONIUS FOSS, BIRGER FJELD HALVORSEN, and NICOLAI STEPHANSEN, all subjects of the King of Norway, residing at or near by Christiania, Norway, respectively, have invented certain new and useful Improvements in Processes for the Manufacture of Hydrogen, Carbon Monoxide or Mixtures of These Gases; and we do hereby declare the following to be a full, clear, and exact description of the invention, such as will enable others skilled in the art to which it appertains to make and use the same.

A known process for the manufacture of gases consists in the heating of gases for instance carbon di-oxide or water vapor in electric furnaces and allowing the dissociated gases in a hot condition to pass through chambers which contains re-agents, such as coal or sulphur compounds. The oxygen is supposed to combine with the re-agents, forming reducing gases containing principally hydrogen and carbon monoxide.

An important disadvantage of this process is that it is difficult to bring the gases up to such a temperature as to result in dissociation to any considerable degree without destroying the material of the furnace.

If the process is to be carried out with sulphur the practical difficulty encountered is that the sulphur evaporates and escapes before the temperature necessary for the reaction is reached.

According to the present invention the process is carried into effect by the use of sulphur in such a manner that the reaction between the gases and the sulphur takes place in the electric arc itself, and not after leaving the arc. In this way the sulphur can be exposed to a very high temperature in the presence of carbon dioxide or water vapor, and a mixture of gases is obtained which, if water vapor and sulphur vapor have been used, besides these two components, also contains sulphur di-oxide, hydrogen and small quantities of hydrogen sulphide, which latter may be formed during the cooling of the gases.

If carbon di-oxide and sulphur vapor are used, the resultant gas contains carbon monoxide, sulphur di-oxide and it may be also small quantities of other compounds as well as some of the original compounds.

Under certain circumstances it may prove more advantageous to work with a mixture of vapor and carbon di-oxide, whereby a mixture of gases is obtained that consists of all of the compounds above-mentioned.

In order to make use of the gas mixture thus obtained it has to be subjected to a purifying process, preferably at the same time utilizing the heat of the gases. The purifying process consists in eliminating the sulphuric compounds and water vapor or carbon di-oxide, so that hydrogen, and carbon monoxide or a mixture of same is obtained.

Besides free sulphur, sulphides are chiefly to be taken into consideration as a source of sulphur. For instance, if iron pyrites is used, sulphur vapor may be obtained by melting the pyrites in an electric melting furnace, by means of which about half of the sulphur in the pyrites is separated. If the melted mass is subjected to hydrolysis, a further quantity of sulphur is separated, iron being precipitated at the same time. This iron, which contains but little sulphur, can be further treated according to known methods, in order to obtain pure iron.

The applicant has also discovered that the sulphides can be utilized immediately in the electric furnace. When heated the sulphide gives off its sulphur which then, in statu nascendi, reacts with the water vapor or carbonic acid, respectively. At the same time the metal reacts with the water vapor and carbon di-oxide to form further quantities of hydrogen and carbon monoxide.

The process is most advantageously effected in an electric flame arc furnace of the tube type, into which the sulphide, for instance pulverized iron pyrites in a finely divided condition, is blown together with the gas. The elimination of the resulting metallic oxide, when of a magnetic character (which is the case when pyrites is used), may readily take place magnetically after the reaction products are sufficiently cooled.

The subsequent treatment and purification of the gases takes place as described above.

We claim—

1. Process for the production of reducing gases, comprising the treatment of gaseous oxygen compounds and sulphur vapors in the electric arc.

2. Process for the production of reducing gases, comprising the treatment of gaseous oxygen compounds with materials which, when heated, emit sulphur in the electric arc.

3. Process for the production of reducing gases, comprising the treatment of gaseous oxygen compounds and sulphuric vapor in the electric arc, and purifying the gas by freeing it from sulphur and sulphur compounds.

4. Process for the production of reducing gases, comprising the treatment of gaseous oxygen compounds with sulphides of heavy metals in an electric arc.

5. Process for the production of reducing gases containing hydrogen and carbon monoxide, comprising the treatment of steam and carbon di-oxide with sulphuric vapor in an electric arc and purifying the gas by freeing it from sulphur and sulphur compounds.

6. Process for the production of reducing gases comprising the treatment of gaseous oxygen compounds with iron pyrites in an electric arc and magnetically separating the iron-oxide from the reaction products.

In testimony that we claim the foregoing as our invention, we have signed our names in presence of two subscribing witnesses.

ANTONIUS FOSS.
BIRGER FJELD HALVORSEN.
NICOLAI STEPHANSEN.

Witnesses:
MOGEN BUGGE,
GULBORG GULBRANDSEN.